Jan. 31, 1967   P. B. SKAARE   3,300,920
REUSABLE STAKES
Filed July 15, 1964   2 Sheets-Sheet 1
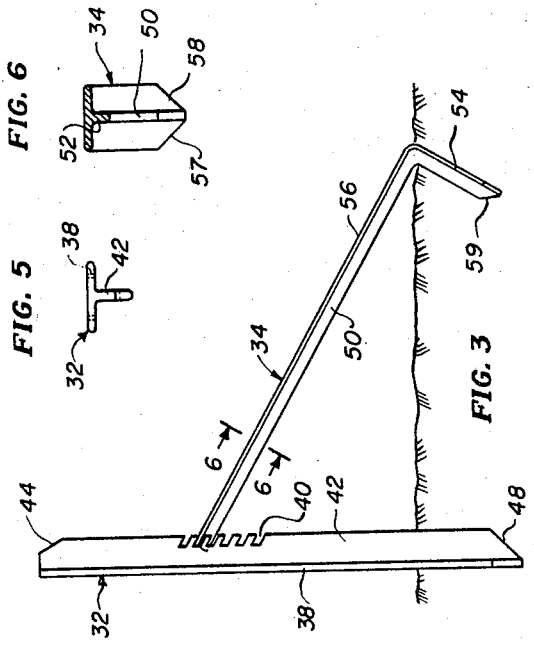
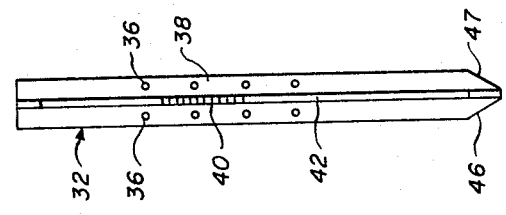
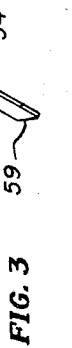
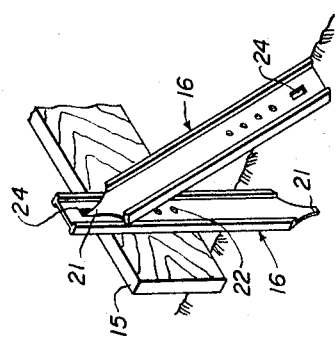
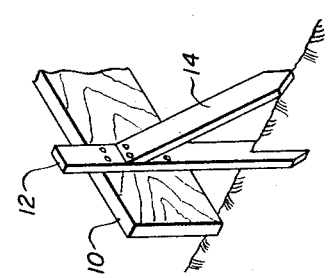
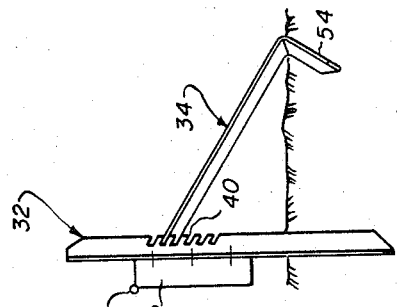
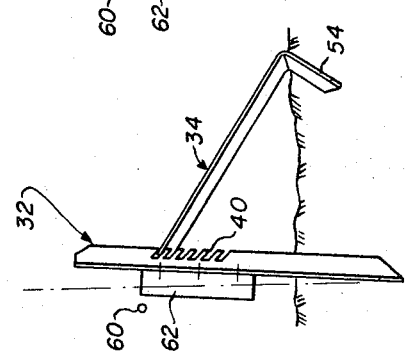
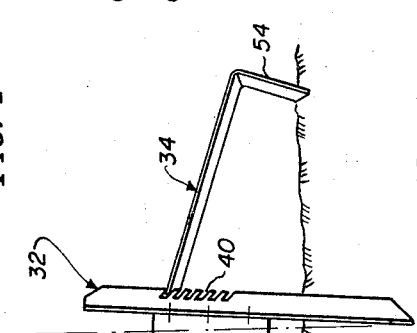
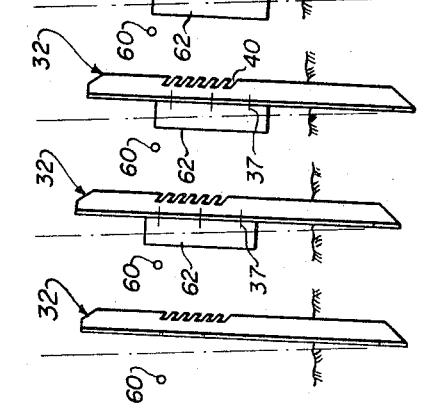
INVENTOR.
Peter B. Skaare
BY Dominik & Stein
Attorneys Jan. 31, 1967     P. B. SKAARE     3,300,920
REUSABLE STAKES
Filed July 15, 1964     2 Sheets-Sheet 2
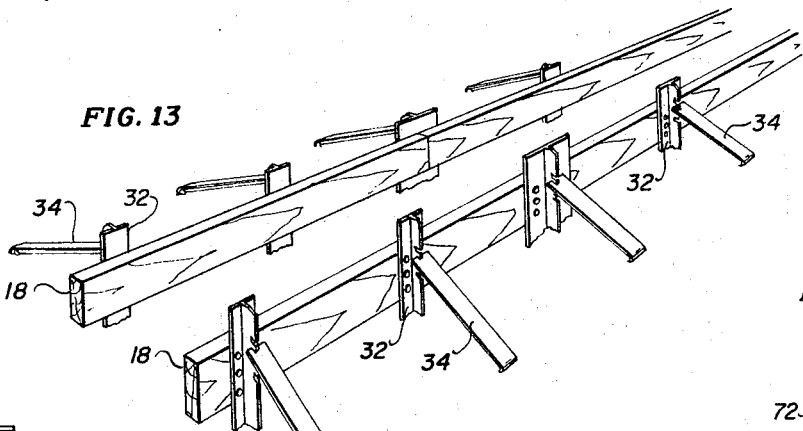
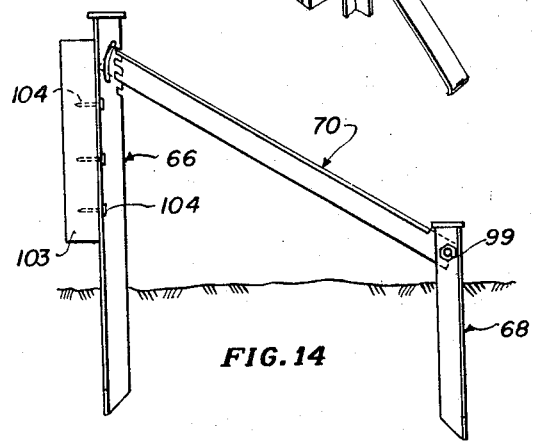
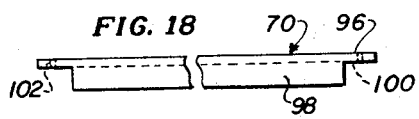
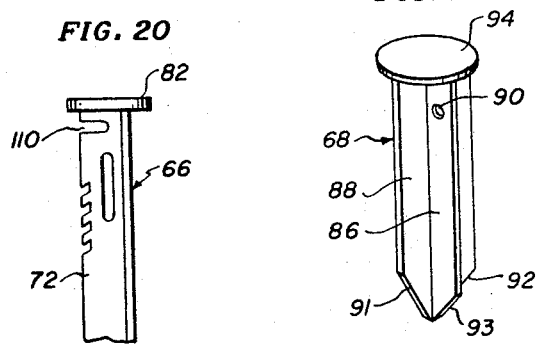
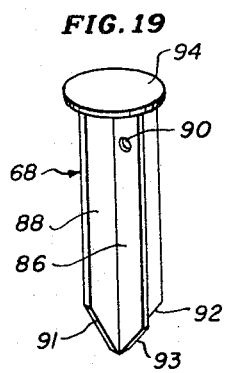
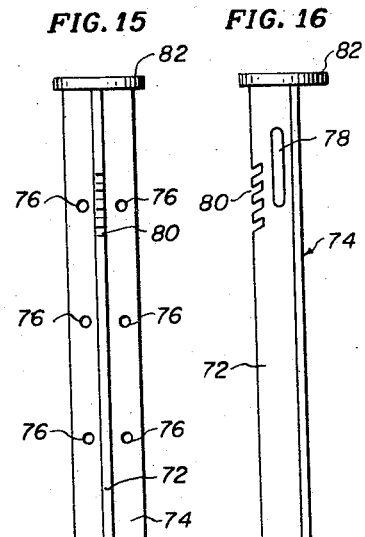
INVENTOR
Peter B. Skaare
BY Dominik + Stern
Attorneys United States Patent Office 3,300,920
Patented Jan. 31, 1967

3,300,920
REUSABLE STAKES
Peter B. Skaare, 345 Pleasant Ave.,
Bloomingdale, Ill. 60108
Filed July 15, 1964, Ser. No. 382,715
10 Claims. (Cl. 52—150)

This invention relates to a method and apparatus for setting forms, defining a structure, into which concrete or the like is to be poured.

When setting forms which define, for example, sidewalks, curbing alongside of a street and the like, a guide line is generally strung between two points and the forms supported and aligned with respect to the guide line by means of wooden stakes and braces. The wooden stakes ared riven into the ground adjacent to the guide line and the forms are secured to the wooden stakes for support. The wooden braces are secured at one end to the wooden stakes and propped against the ground to align the forms with respect to the guide line.

An experienced form setter can set forms using wooden stakes and braces quite rapidly, but even at that it is a time consuming task. Also, time must be expended to remove, or take down, the forms, since the forms, the wooden stakes and the braces are usually nailed to one another. The latter is particularly time consuming since care must be exercised in taking the forms down to avoid damaging or destroying the stakes and braces so that reuse is possible.

A contractor literally uses hundred of these wooden stakes and braces in a relatively short period of time because they are generally rendered useless after two or more uses, due to splitting when the forms are taken down or because of being "pounded to pieces" on being driven into the ground or for other reasons. Wooden stakes and braces, therefore constitute a considerable expense to the contractor, even though, individually, they are relatively inexpensive.

It is also found that wooden braces do not always provide the support needed to maintain the forms in proper alignment. The braces tend to slide along the ground, particularly when the ground is extra hard or extra soft or muddy, and the side walls therefore are not straight, or may give away and allow the concrete or the like to spill out of the forms, hence ruining the structure. The latter result occurs most often at the joints where the forms are butted together and secured to a stake, since the stakes tend to split, or twist, due to the uneven pressure applied thereto.

The fact that the braces tend to slip also makes it rather difficult to align the forms with the guide lines, and hence it requires a longer time to set the forms.

Metal stakes have been substituted for the wooden stakes, however, those presently available are generally no more satisfactory than the wooden stakes. Various types have been designed to allegedly simplify the setting of the forms and to be reusable but the cost of the same have not been commensurate with the additional advantage provided to justify the additional cost.

It is therefore an object of this invention to provide an improved stake assemblage for use in setting forms or the like.

It is a further object to provide an improved stake assemblage for use in setting forms or the like, whereby the forms may be set more easily and more speedily than heretofore generally possible. In this latter respect, it has been found that the forms may be set approximately thirty percent faster than heretofore possible.

It is a still further object to provide an improved stake assemblage which is reusable, and has a generally longer life than those heretofore available.

It is a still further object to provide an improved stake assemblage for use in setting forms or the like which is relatively inexpensive.

It is a still further object to provide an improved stake assemblage which is easily repaired when damaged.

It is a still further object to provide an improved stake assemblage which provides a generally far greater support for forms or the like than those heretofore available.

It is a still further object to provide an improved method for setting forms or the like.

Other objects of the invention will in part be obvious and will in part appear hereinafter.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGS. 1 and 2 are views illustrating various apparatus of the prior art, and the method in which they are used to set a form;

FIG. 3 is a side view of a stake assemblage exemplary of the present invention, the stake assemblage being shown with a form secured thereto, as it is used to set a form;

FIGS. 4 and 5 are front and top views, respectively, of the form support member of the stake assemblage of FIG. 3;

FIG. 6 is a view of the brace member of the stake assemblage, taken along lines 6—6 of FIG. 3;

FIGS. 7–12 are views illustrating the method of setting a form, using the stake assemblage of FIG. 3;

FIG. 13 is a perspective view illustrating a form constructed using stake assemblages, as shown in FIG. 3;

FIG. 14 is a side view of a stake assemblage exemplary of a second embodiment of the invention, the stake assemblage having a form secured thereto, as it is used to set a form;

FIGS. 15–17 are front, side and top views, respectively, of the form support member of the stake assemblage of FIG. 14;

FIG. 18 is a top view of the brace member of the stake assemblage of FIG. 14;

FIG. 19 is a perspective view of the brace support member of the stake assemblage of FIG. 14; and FIG. 20 illustrates a modified form support member similar to that of FIG. 15.

Similar reference characters refer to similar parts throughout the several views of the drawings.

Referring now to FIG. 1 which illustrates the above mentioned method of setting a form using wooden stakes and braces, the form 10 (partially shown) is shown nailed to a wooden stake 12 which is driven into the ground. A wooden brace 14 has one end nailed to the stake 12 and the other end braced against the ground. The stake 12 and the brace 14 are generally formed with a point on one end so that they may be more easily driven into the ground and braced against the ground, respectively. The objectionable features and the disadvantages of wooden stakes and braces of this type are generally set forth above.

In FIG. 2 is illustrated a form 15 set using a metal stake 16 and brace 18 exemplary of the prior art. The metal stake 16 and the brace 18 are identical units and comprise I-shaped angle irons. The web portions 20 thereof have a number of apertures 22 formed therein in spaced relation and an enlarged slot-like aperture 24 formed therein near the top end. The bottom end of the stakes and braces are pointed and have blunt tips 21 which are formed so as to be engageable in the apertures 24.

The stake 16 is driven into the ground and the form 15 secured thereto by means of nails 26 extended through apertures 22. The flat end of the brace 18 is braced against the ground and the blunt tip 21 on the opposite end is inserted into the apertures 24 formed in the stake 16 to align the form 15 with a guide line or the like.

While this type of metal stakes and braces are reusable, it is apparent that they possess the same objectionable feature as the above mentioned wooden stakes and braces in that the braces 18 also have a tendency to slide along the ground when it is extra hard or extra soft.

A stake assemblage 30 exemplary of the present invention is shown in FIG. 3. The stake assemblage 30, as will be apparent from the description which follows, is far superior to, and provides numerous benefits over, those heretofore available.

The stake assemblage 30 includes a T-shaped form support stake 32 and a T-shaped brace member 34. The form support stake 32, as may be best seen in FIGS. 3–5, has a number of apertures 36 formed in the cross-bar 38 thereof in spaced relation for receiving nails or the like for securing a form thereto and a number of upwardly angled slots or notches 40 formed in the edge of the stem 42 thereof for receiving the end of the brace member 34, in a manner described hereinafter.

The form support stake 32 is preferably substantially longer in length than actually needed, or required, and the apertures 36 and the notches 40 are formed therein adjacent one another near the mid-point of the stake. The top end of the stem 42 has an angularly cut corner 44 which relieves the force exerted on the stem 42 when the stake 32 is driven into the ground, so that the notches 40 are not deformed. Also, the lower end of the cross-bar 38 and the stem 42 have angularly cut corners 46–47 and 48, respectively, so that the form support stake 32 may be more easily driven into the ground.

In view of the fact that the form support stake 32 is driven into the ground, the top end thereof may become slightly battered after an extended period of use. It has been found, however, that the usefulness of the stake 32 is not curtailed, and to renew the appearance of the stake 32 the top end thereof is merely cut off and reshaped as it was originally formed. This may be repeated numerous times since, as stated, the stake 32 is substantially longer than need be.

The T-shaped brace member 34 is bent at one end, with the stem 50 projecting downwardly below the cross-bar 52, to form a leg 54 which is preferably at a right angle to its main body portion 56. The cross-bar 52 and the stem 50 at the end of the leg 54 have angularly cut corners 57–58 and 59, respectively, so that the leg 54 can be more easily driven into the ground.

The opposite end of the brace member 34, when assembled, as shown in FIG. 3, is engaged in one of the notches 40 formed in the edge of the stem 42 of the form support stake 32, and the notches 40 are accordingly formed to receive the same.

The form support stake 32 and the brace member 34 can both be formed of ⅛" metal stock, having a 1" cross-bar 38 and a 1" stem 42. It has been found that this size is satisfactory for most applications and that increasing the stock size to ¼" or larger does not improve the lifetime of the stake assemblage since a large force is required to drive the members into the ground and the large force has a more damaging effect. The form support stakes 32 used at the joints where the forms are butted together are preferably provided with a larger width cross-bar 38 on the order of 2–4 inches so that a larger surface is provided to support the ends of the forms.

In FIGS. 7–12 are shown the steps which may be used to set a form, such as shown in FIG. 13, using the stake assemblage of the present invention. A guide line 60 is strung between two points to define the path and the height the form is to take, and a number of form support stakes 32 are driven into the ground in spaced relation adjacent to the guide line 60, in the manner shown in FIGS. 7–12. The form 62 is secured to the stakes 32 by extending nails 37 or the like through the apertures 36 in the cross-bars 38, and the form adjusted as to height by driving the stakes 32 into the ground accordingly, as shown in FIG. 9.

The brace members 34 are positioned with the forward end edge of one side of the cross-bar 52 engaged in the topmost notch 40 of the stakes 32 and the ends of the legs 54 resting on the ground, as shown in FIG. 10. The legs 54 are then driven into the ground, preferably the entire length thereof, as shown in FIG. 11.

The form 62 is then aligned with the guide line 60 by forcing the individual stakes 32 toward the guide line, and simultaneously adjusting the end of its associated brace member 34 to engage the same in the appropriate notch 40 to maintain the form 62 in alignment with the guide line.

It is apparent in viewing FIGS. 7–12 that forms may be easily and rapidly set using the stake assemblages 30 of the present invention. The braces 34 provide excellent support for the form support stakes 32, and hence the forms secured thereto, since the ends thereof are deeply seated, or set, in the ground and cannot slide, or slip. The forms can therefore be aligned much faster since, once the braces 34 are set, they are securely fixed and rarely, if ever, need to be re-set due to sliding. For this same reason, the forms may be aligned much straighter than heretofore generally possible, since the form support stakes are securely maintained in an aligned position, with the forms aligned with a guide line.

The alignment of the forms with a guide line is also positively accomplished in a relatively easy and rapid fashion since it is only necessary to adjust the position of the form support stake 32 to align the form with the guide line and to then simultaneously engage the end of the brace 34 in the appropriate notch 40 in the form support stake 32.

The forms and the stake assemblages 30 may be easily and rapidly disassembled, or taken down, with relatively little effort, hence considerable time may be saved during this operation. It is only necessary to pry the end of a pickaxe or the like under the brace 34 near the leg 54 thereof and to extract the same from the ground. It is unnecessary, as in the case of the wooden stakes and braces, to "un-nail" the braces from the stakes since the ends of the braces are only forcibly engaged in the notches 40 of the stakes 32. The forms usually may be separated from the stakes 32 by striking the top end of the stakes once with a hammer to slightly separate the two and by then prying them completely apart using a crowbar or the like. Since both the stakes and the braces are metal, there is little danger, if any, in damaging them, as in the case of the wooden stakes and braces.

The advantages of the stake assemblages 30 over the metal stakes and braces present available, such as those shown in FIG. 2, is apparent. In the first place, the braces are positively seated, or set, whereas those of the prior art are not and secondly, there is no range of adjustment to align the forms, as in the case of the stake assemblages of the present invention.

Referring now to FIG. 14, a stake assemblage exemplary of a second embodiment of the invention is shown including a form support member 66, a brace support member 68 and a brace member 70. The form support member 66, as may be best seen in FIGS. 15, 16 and 17, is T-shaped, having a stem 72 perpendicularly connected to a cross-bar 74. The cross-bar 74 has a plurality of apertures 76 formed therein in spaced relation for receiving nails or the like so that a form may be secured to the form support member. The stem 72 has an elongated slot 78 formed therein near its top end and a number of upwardly angled notches 80 formed along the edge thereof adjacent the slot 78. The top end of the form support member 66 has a striking plate 82 which may be circular in shape overlying the stem 72 and the crossbar 74. The lower corners 83, 84 and 85 of the crossbar 74 and the stem 72, respectively, are angularly cut so that the form support member may be more easily driven into the ground.

The brace support member 68, as may be best seen in FIG. 19, is T-shaped, having a stem 86 perpendicularly connected to a cross-bar 88. The stem 86 has a bolt receiving aperture 90 formed therein near its top end and the lower end corners 91, 92, and 93 of the cross-bar 88 and the stem 86, respectively, are angularly cut. A striking plate 94 is secured to the top of the brace support member and overlies the cross-bar 88 and the stem 86.

The brace member 70, as may be best seen in FIG. 18 is L-shaped, having legs 96 and 98 arranged at right angles to one another. It may be noted that leg 98 is terminated short of leg 96 at both ends of the brace member, for reasons to be explained.

The brace member 70 is pivotally secured to the brace support member 68 by means of a nut and bolt 99 (FIG. 14) or the like passed through the aperture 90 formed in the brace support member 68 and the aperture 100 formed in the brace member 70. The opposite end of the brace member 70 is secured to the form support member 66 by means of a nut and bolt (not shown) extended through the aperture 102 and slidably retained with the elongated slot 78. The arrangement is such that the edge of the brace member 70 is engageable in one or the other of the notches 80 formed in the edge of the stem 72 of the form support member 74 as the bolt slides downwardly in the slot 78.

In setting and aligning the forms, the form support member 66 is driven into the ground by pounding the striking plate 82 on its top end with a sledge hammer or the like, and the form 103 secured thereto by means of nails 104 or the like extended through the apertures 76 in the cross-bar 74 of the form support member 66. Of course it is obvious that the form 103 could be secured to the form support member before it is driven into the ground. The brace support member 68 is then driven into the ground by pounding the same on the striking plate 94 on its top end, with the brace support member 68 in a substantially vertical position. To align the form 103 with a guide line, a force is exerted downwardly on the brace member 70 so that the bolt is slid downwardly in the elongated slot 78 until the form is vertically aligned. When the form is vertically aligned, the form support member 66 is retained in this position by means of the edge of the leg 98 of the brace member 70 being engaged in one or the other of the notches 80 formed in the edge of the stem 72 of the form support member 66.

The form support member 66 may be modified, as shown in FIG. 20, by forming a slot 110 traversely to the stem 72, slightly below the striking plate 82. The slot 110 relieves the pressure exerted on the notches 80 when the form support member 66 is being driven into the ground so that the notches 80 are not deformed.

While several specific constructions have been shown and described, it is apparent that various changes may be made in the construction without departing from the scope of the invention. For example, the form support stake of FIGS. 3–5 could be modified by forming the notches 40 in the cross-bar 38 rather than the stem 42 and the brace 34 correspondingly modified with a forked end so as to straddle the stem 42 and to engage the notches in the cross-bar 38.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A metal stake assemblage for supporting and aligning forms for concrete and the like comprising: a T-shaped form support member having a stem portion perpendicularly connected to a cross-bar portion, said crossbar portion having a plurality of apertures formed therein for receiving fastening means for securing a form to said form support member, said stem portion having a plurality of notches formed in the edge thereof in spaced relation; and a brace member having a stem portion perpendicularly connected to a cross-bar portion, one end of said brace member being angularly disposed with respect to the main body portion thereof so as to form a leg which is drivable into the ground, the cross-bar portion at the opposite end thereof being engageable in respective ones of said plurality of notches to vertically align and support said form support member when said form support member is partially driven into the ground.

2. The metal stake assemblage of claim 1 wherein said form support member is substantially longer than normally required to support and align said forms and wherein said apertures and said notches are positioned near the midpoint of said form support member, whereby the upper ends of said form support members can be cut-off to repair damaged form support members to thereby effectively extend the useful life of said form support members.

3. The metal stake assemblage of claim 1 wherein the upper corner of said stem portion of said form support member is angularly formed to thereby relieve the force of a blow on the upper end of said form support member on said plurality of notches.

4. The metal stake assemblage of claim 1 wherein the end of said brace member forming said leg which is driveable into the ground is disposed at a right angle with respect to the main body portion thereof, with the stem portion projecting downwardly below the cross-bar portion.

5. The metal stake assemblage of claim 1 wherein said form support member has an elongated slot formed in said stem portion thereof positionably aligned adjacent said notches, and wherein said brace member comprises a pair of leg members pivotally affixed to one another at one end thereof, the opposite end of one of said leg members being adapted to be driven into the ground and the opposite end of the other one of said leg members being secured to form said support member by means slidably retained within said elongated slot and arranged so that the end thereof is engageable in respective ones of said plurality of notches.

6. The metal stake assemblage of claim 1 further including striking plate means secured to the top end of said form support member and said brace member, respectively.

7. The metal stake assemblage of claim 6 further including a transversely disposed slot formed in said stem portion of said form support member below said striking plate.

8. A method of supporting and aligning forms with a stake assemblage including a form support member having a plurality of apertures formed therein and a plurality of notches formed therein adjacent said apertures and a brace member having one end thereof angularly disposed with respect to the main body portion thereof and arranged to be driven into the ground comprising the steps of driving said form support member into the ground, securing a form to said form support member, resting the angularly disposed end of said brace member on the ground with the opposite end thereof engageable in one of said plurality of notches, driving the angularly disposed end of said brace member into the ground, aligning said form support member and simultaneously engaging the end of said brace member in one of said notches to maintain said form support member in proper alignment.

9. A method of supporting and aligning forms with a stake assemblage including a form support member having a plurality of apertures formed therein and a plurality of notches formed therein adjacent said apertures and a brace member having one end thereof angularly disposed with respect to the main body portion thereof and arranged to be driven into the ground comprising the steps of driving said form support member into the ground, securing a form to said form support member, engaging the end of said brace member in one of said notches while resting the angularly disposed end thereof on the ground, driving the angularly disposed end thereof into the ground, aligning said form support member and simultaneously adjusting the end of said brace member to engage the end thereof in one of said notches to maintain said form support member in proper alignment.

10. A method of supporting and aligning forms with a stake assemblage including a stake member having a plurality of apertures formed therein in spaced relation, a plurality of notches formed therein in spaced relation adjacent said apertures and an elongated slot formed therein and positioned between said apertures and said notches; a brace support member having an aperture formed therein; and a brace member secured at one end thereof to said stake member by means slidably retained within said elongated slot and arranged so that the end of said brace member is engageable in one of said plurality of notches and pivotally secured at the other end thereof to said brace support member by means pivotally secured within said aperture in said brace support member, comprising the steps of driving said stake member into the ground, securing a form to said stake member, positioning the means slidably retaining said brace member upwardly in said elongated slot, driving said brace support member into the ground, aligning said form support member and simultaneously adjusting the end of said brace member to engage the end thereof in one of said notches to maintain said form support member in proper alignment.

References Cited by the Examiner

UNITED STATES PATENTS

| | | | |
|---|---|---|---|
| 469,322 | 2/1892 | Spoore | 52—146 X |
| 605,393 | 6/1898 | Childers | 52—146 X |
| 1,146,128 | 7/1915 | Brune | 135—15 |
| 1,161,865 | 11/1915 | Jones et al. | 52—150 |
| 1,897,530 | 2/1933 | Pandolfi | 249—4 |
| 2,635,320 | 4/1953 | Ornitz | 249—5 |

FOREIGN PATENTS 222,122  6/1959  Australia.

RICHARD W. COOKE, JR., *Primary Examiner.*